UNITED STATES PATENT OFFICE

SILAS P. KNIGHT, OF BROOKLYN, NEW YORK.

IMPROVEMENT IN ELECTROTYPE-PLATES.

Specification forming part of Letters Patent No. 20,353, dated May 25, 1858; extended seven years; reissue No. 5,044, dated August 27, 1872.

*To all whom it may concern:*

Be it known that I, SILAS P. KNIGHT, of Brooklyn, in the county of Kings and State of New York, formerly of the city of New York, have invented a new and useful Improvement in the Production of Electrotype-Plates; and I do hereby declare that the following is a full, clear, and exact description of the same.

It is well known that when wax or gutta-percha molds, coated with plumbago, are placed in a battery, and a deposit of copper or other metal made upon the surface of the mold, the action is at first slow and confined to particular parts of the surface, thereby requiring in some cases several hours to produce a uniform and unbroken metallic covering throughout the whole extent of the mold. It also sometimes happens that the plumbago does not perfectly adhere to the wax surface of the mold, and consequently the deposit is not uniform.

These defects are removed by my improved process of obtaining electrotype-plates, and the deposit is caused to take place uniformly over the whole surface of the mold immediately upon the immersion of the latter in the battery solution, thus saving many hours in the production of a plate, and insuring a deposit of uniform thickness.

My invention consists in a certain treatment, as hereinafter described, of plumbago-coated molds, for the purpose of producing a metallic film thereon in order to expedite and render more uniform the after deposit by the battery.

The following is a sufficiently minute description of the mode of proceeding to enable others skilled in the art of producing electrotype-plates to practice my invention.

The wax mold or matrix being made in the usual or any suitable manner, and coated with plumbago, is then placed upon a table with its face upward, and a saturated solution of blue vitriol or sulphate of copper is sprinkled upon it so as to moisten nearly the entire surface. Upon this I scatter, from a fine sieve or muslin bag, metallic dust or fine powder, preferring for this purpose the dust of cast-iron, which may be obtained from under cutting and boring machines where cast-iron is worked, the finest dust being the most suitable for this purpose. The dust being sifted upon the mold, is then distributed as uniformly as possible over its surface by means of a flat camel's-hair brush, which is passed rapidly and with a light touch over the coating of plumbago. During this process, the sulphate of copper is decomposed, and metallic copper is deposited in a thin film over the whole surface of the mold.

This brushing or distribution of the fine particles of iron does not require more than five minutes for an area of one foot, at the end of which time the mold is found to be coated with a thin film of copper over its whole surface, as above stated.

The mold is now cleansed by immersion in pure water, or by allowing water to flow over it, thus removing the solution and dust. It may then be placed in the battery and the usual connection made, when it will be found that the deposit commences on all parts of the surface at the same instant, thus insuring a uniform thickness of the metal, and diminishing to a great extent the time required for exposure of the mold to the action of the battery.

After the cleansing above named it is not necessary that the molds be placed immediately in the battery; but they may be set aside and the deposit completed at any subsequent time.

What is here claimed, and desired to be secured by Letters Patent, is—

The treatment of the plumbago-coated mold with a solution of the sulphate of copper and the dust of iron, whereby a metallic film is produced, substantially as and for the purpose herein set forth.

SILAS P. KNIGHT.

Witnesses:

FRED. HAYNES,

FERD. TUSCH.